United States Patent [19]

Davis

[11] Patent Number: 4,839,428

[45] Date of Patent: Jun. 13, 1989

[54] METHOD FOR IMPROVING GREEN STRENGTH PROPERTIES OF VULCANIZABLE RUBBER COMPOSITIONS

[75] Inventor: James A. Davis, Uniontown, Ohio

[73] Assignee: The Firestone Tire & Rubber Company, Akron, Ohio

[21] Appl. No.: 232,341

[22] Filed: Aug. 15, 1988

Related U.S. Application Data

[63] Continuation of Ser. No. 853,074, Apr. 17, 1986, abandoned.

[51] Int. Cl.$^4$ ............ C08L 7/00; C08L 9/00; C08L 9/06; C08L 11/00
[52] U.S. Cl. .................... 525/215; 525/236; 525/237
[58] Field of Search ................ 525/215, 237

[56] References Cited

U.S. PATENT DOCUMENTS

| | | | |
|---|---|---|---|
| 2,729,608 | 1/1956 | Strain | 260/4 |
| 3,714,296 | 1/1973 | Kitagowa et al. | 525/215 |
| 3,827,991 | 8/1974 | Ando et al. | 525/215 |
| 3,943,193 | 3/1976 | Miyagawa et al. | 525/215 |
| 4,048,261 | 9/1977 | Starmer | 525/215 |
| 4,254,013 | 3/1981 | Friedman et al. | 525/215 |
| 4,267,079 | 5/1981 | Davis et al. | 525/215 |
| 4,309,332 | 1/1982 | Fischerelal | 260/4 OR |
| 4,316,825 | 2/1982 | Wirth | 260/5 |
| 4,421,900 | 12/1983 | Hamed | 525/215 |
| 4,454,204 | 6/1984 | Tsai | 525/215 |
| 4,584,350 | 4/1986 | Davis | 525/215 |

FOREIGN PATENT DOCUMENTS

| | | |
|---|---|---|
| 0060414 | 2/1982 | European Pat. Off. . |
| 3223138 | 6/1981 | Fed. Rep. of Germany . |
| 1587100 | 4/1981 | United Kingdom . |

*Primary Examiner*—Allan M. Lieberman
*Attorney, Agent, or Firm*—Daniel N. Hall

[57] ABSTRACT

This invention is directed toward a method for improving the green strength properties of vulcanizable rubber compositions comprising the step of mixing a halogenated polymer with the vulcanizable rubber composition prior to curing in an amount ranging from about 5 to 25 weight percent of the rubber in the composition.

7 Claims, No Drawings

METHOD FOR IMPROVING GREEN STRENGTH PROPERTIES OF VULCANIZABLE RUBBER COMPOSITIONS

This application is a continuation of application Ser. No. 853,074, filed 4-17-86 now abandoned.

TECHNICAL FIELD

The present invention provides a method for improving green strength properties of a vulcanizable rubber composition suitable for use in the manufacture of such rubber articles, as tires, conveyor belts, hoses and the like. Green strength is a term used in the rubber industry to denote the strength, cohesiveness and dimensional stability of a vulcanizable rubber composition while it is in the unvulcanized or uncured state.

Improved green strength is particularly important when multiple ply layers, at least two of which are contiguous, are employed in the rubber article. Green strength of a rubber composition is important in a number of manufacturing applications, such as, in the manufacture of radial tires, or industrial products, i.e., tank tracks, carft gear pads, airides and the like, wherein the rubber composition must be stretched uniformly from one mill to another, i.e., calender warm-up or breakdown mill to calender feed mill or from the calender feed mill to the calender unit itself. These rubber compositions must stretch or resist tearing or sagging during the transfer of rubber stock from one mill to another. This calls for a rubber having sufficient green strength and green elongation so that the rubber composition will not tear, wrinkle, sag or the like, but instead will elongate very much as rubber in the cured state.

Generally, the manufacture of these articles involves the assembly of a plurality of layers of rubber known as skim stocks that have been reinforced with natural or synthetic fibers or steel wire, plated or unplated. The skin stocks are first calendered into large continuous sheets from which component parts or ply layers are cut into predetermined sizes and shapes. After the plies are assembled together with other necessary components, the article is customarily cured by heating under pressure in a mold whereby the final shape of the article is imparted. Prior to curing it is important that the rubber composition elongate uniformly during this increase in diameter and that the reinforcing fibers, i.e., fiberglass, steel cord, nylon, polyester and the like, spread evenly with the rubber in the tire carcass during expansion on the tire building drum or as the tire is being shaped in the tire curing press.

Inasmuch as the article cannot readily be formed from a single layer having the desired thickness, two or more of the foregoing plies are often combined, which facilitates manufacture of the article. Stitching operations, whereby an overlying ply or end is pressed down onto or against the underlying ply, tend to force the uncured or green, rubber together until the article is cured. During curing it is important that the plies knit together and maintain their original form and shape; otherwise, performance of the product would be detrimentally affected, thus, rendering it dangerous and unfit for use.

Typical of the plies normally employed in the manufacture of tires are belt plies, breaker plies and body plies. All three comprise reinforced skim stock as described hereinabove. The body ply generally extends from bead to bead and breaker or belt plies, usually two, are positioned circumferentially between the body ply and tread. Belt plies have a cord angle (reinforcing element) significantly different from the body ply angle. Given the different function as well as cord angle of these plies, it is evident that no single ply could be constructed to serve all purposes and therefore, the combination of individual plies is required. Clearly, the ability of the belt to adhere to adjacent belts is demanded in the cured tire to insure that all components remain properly oriented in order for the tire to function as designed.

Therefore, the use of rubber compositions with higher green strength, i.e., in body ply skims or steel belt skims should help eliminate the occurrence of spread cords which are known to occur from time to time during the hanging of an uncured or green tire under high heat and humidity conditions for a long period of time prior to curing.

It has now been determined that the incorporation of minor amounts of a halogenated polymer into a rubber composition prior to curing will increase the overall green strength and green elongation of a vulcanizable rubber composition, i.e., a body ply skim.

BACKGROUND ART

With respect to improved green strength, British Pat. No. 1,587,100 discloses an improved method for processing synthetic green strength polymers. The method for processing basically entails two mixing steps, the first being the mixing of the non-green strength polymer with carbon black and other compounding additives except the cure active ingredients, and the second mixing step being the mixing of the contents of the first mixture with the green strength polymer, cure active ingredients and other compounding ingredients. The green strength polymer is preferably a polymer such as styrene-butadiene containing bound tertiary amine groups which have been reacted with a dihalogen compound to form quaternary ammonium salts.

Another patent directed toward improved green strength is U.S. Pat. No. 3,827,991 which discloses a rubber composition exhibiting improved green strength which comprises 3 to 50 percent by weight of a 1,2-polybutadiene having a 1,2 addition unit content of 70 percent or higher and crystallinity of 5 percent or higher and 97 to 50 percent by weight of at least one conjugated diene-based rubbery polymer selected from the group consisting of styrene-butadiene copolymer rubber, polyisoprene rubber, natural rubber, acrylonitrile-butadiene copolymer rubber and polychloroprene rubber.

Another patent directed toward green strength improvement is U.S. Pat. No. 4,316,825 which discloses that the green strength of styrene-butadiene rubber, styrenebutadiene rubber/polybutadiene, natural rubber and blends thereof can be improved by blending with EPDM or EPM having a high degree of crystallinity.

With respect to the use of halogenated polymers in a rubber skim stock, U.S. Pat. No. 4,267,079, owned by the Assignee of record, discloses that the addition of Neoprene, a halogenated polymer, will improve adhesion and adhesion retention properties between the rubber skim stock and the metallic reinforcement. The addition is also disclosed as improving modulus properties of the cured rubber composition.

While others have described various methods of improving green strength and also the use of halogenated polymers, the employment of halogenated polymers to improve green strength has not been described in any patents or publications of which I am aware.

DISCLOSURE OF THE INVENTION

In general, the subject invention is directed toward a method for improving the green strength and green elongation of vulcanizable rubber compositions comprising the step of mixing a halogenated polymer with the vulcanizable rubber composition prior to curing in an amount ranging between about 5 to about 25 weight percent of the rubber in the composition.

PREFERRED MODE FOR CARRYING OUT THE INVENTION

To illustrate the present invention, a typical rubber skim stock is presented hereinbelow which is suitable for preparation of rubber articles such as body ply skim for tires which have multiple plies or metal or fabric reinforced articles where a high green strength rubber composition is desired. Green strength properties of the stock have been measured and are also presented hereinbelow. It is to be understood that the composition of the rubber skim stock provided is not part of the present invention and that it has been presented solely to enable those skilled in the art to have at least one rubber skim stock with which to practice the invention.

It has been found, in accordance with the practice of this invention, that the green strength and elongation of a rubber composition comprising natural rubber in a blended state with one or more synthetic rubbers such as styrenebutadiene, polybutadiene, synthetic isoprene or other synthetic rubbers, with a natural rubber content of at least 20 to 30 percent. Polymer type, here, is not deemed to be a limitation to the practice of the instant invention. Thus, natural rubber can be employed alone and pure forms of synthetic rubbers such as those disclosed may be used either alone or blended with other synthetic rubbers to improve green strength properties without interfering with cure or vulcanization.

As stated hereinabove, practice of the subject invention requires the addition of a halogenated polymer to the vulcanizable rubber composition prior to curing. Examples of suitable halogenated polymers include chloroprene, (2-chloro-1,3-butadiene) and chlorosulfonated polyethylene.

With respect to chloroprene, the polymer is preferably added in its polychloroprene form commonly known as Neoprene. Neoprenes are generally categorized as G-types, W-types and T-types, each being well known to those skilled in the art. The preferred Neoprene for incorporation into the rubber skim stock is Neoprene W which contains about 40 percent chlorine by weight and has a high degree of crystallinity which is important to improving green strength. The degree of crystallinity in Neoprene is largely dependent upon the amount of trans configuration in the polymer itself. Increasing the amount of trans configuration increases the degree of crystallinity. However, each of the other types of Neoprenes can be substituted for Neoprene W in substantially the same amounts.

With respect to chlorosulfonated polyethylene, a commonly employed one is Hypalon ® synthetic rubber and has the following basic structure:

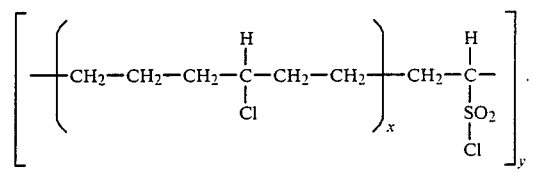

Hypalon ® typically contains from 25 to 43 percent chlorine and about 1 to 1.5 percent sulfur.

Addition of the halogenated polymer is directly to the vulcanizable rubber composition, along with several other rubber compounding rubber chemical additives to form a rubber masterbatch, prior to curing. The halogenated polymer is usually added in amounts of from about 5 to about 25 weight percent of the rubber component.

In order to determine the improvement in green strength properties with the mixing of a halogenated polymer into a rubber composition, standard green strength elongation-modulus tests were conducted on three examples utilizing a floor model Instron tester. The following procedure was followed:

DETAILED GREEN STRENGTH TEST PROCEDURE

1. All compounds were prepared using a B-size laboratory Banbury and were sheeted out using a standard 30.48 cm two-roll laboratory mill.
2. Using a Clicker machine and a 7.62×15.24×0.254 cm die, an adequate number of samples from the sheeted stock were prepared.
3. A slab was pressed 5 minutes at 100° .C in a 7.62×15.24×0.254 cm slab mold and then allowed to equilibrate at 23±2° C. for 24 hours prior to testing
4. Test samples (1.27×7.62 cm) were cut by hand from the preformed rubber slab.
5. Testing Machine: Floor model Instron tester, Model No. TTD.
6. Crosshead and chart speed 50.8 cm/minute at a full scale load of 45.4 Kg; test temperature, 23±2° C.
7. Prior to testing, the jaw separation on the Instron tester is set at 2.54 cm.
8. The test samples were pulled to break or 1250% elongation (maximum elongation). Record initial and peak green strength in psi, green strength at break or green strength at 1250% elongation in psi and elongation at break or maximum elongation in percent were recorded. The results, recorded in psi values were multiplied by 0.0703 to obtain kilograms per square centimeter.

In the test which follow, a natural rubberstyrene butadiene rubber/polybutadiene rubber triblend skim stock, Stock A, was prepared using a B-size laboratory Banbury and utilized as a control without a halogenated polymer and for two separate examples in which a halogenated polymer was added. With the exception of triblend and halogenated polymer content, the ingredients of Stock A have been specified on the basis of parts per hundred parts of rubber (phr) according to the weight of the rubber, unless otherwise specified. Test A was conducted at 23±2° C.

| Compounding Ingredients | Stock A |
|---|---|
| Natural rubber | 40 |
| Styrene butadiene rubber | 40 |

| Compounding Ingredients | Stock A |
| --- | --- |
| Polybutadiene rubber | 20 |
| FEF carbon black (ASTM N-550) | 60 |
| Zinc Oxide | 5.0 |
| Stearic acid | 1.5 |
| Hydrocarbon resins[1] | 5.0 |
| Naphthenic process oil[2] | 8.5 |
| Sulfur MB[3] | 3.0 |
| Santocure NS[4] | 1.0 |

[1] Piccopale 100 - High softening point (100° C.) members of a series of low molecular weight, aliphatic hydrocarbon resins derived mainly from dienes and other reactive olefin monomers
[2] Circosol 410 - a known oil of medium solvency containing a 35% minimum of naphthene ring carbons, light yellow to amber oil, having a flash point of 166° C. minimum, and a specific gravity of about 0.88 to 0.93 at 25° C.
[3] 80/20 insoluble sulfur and naphthenic process oil preblend. The sulfur is a yellow powder, 89.5% minimum of which is insoluble sulfur
[4] N—tert-butyl-2-benzothiazole-sulfenamide The invention will be better understood by reference to the following examples which are intended to illustrate, but in no way limit, the scope of this invention. In these examples, as elsewhere in this specification and the attached claims, all parts are by weight and temperatures in degrees celsius, unless otherwise indicated to the contrary.

The green strength properties for these three examples have been summarized in Table I. All three examples were five days old when tested.

TABLE I

| Green Strength Properties of Uncured Compounds at 23° C. | | | |
| --- | --- | --- | --- |
|  | Control | Ex. 1 | Ex. 2 |
| Polymer Composition | | | |
| Natural rubber | 40 | 40 | 40 |
| Emulsion SBR | 40 | 40 | 40 |
| Polybutadiene | 20 | 15 | 10 |
| Neoprene W | 0 | 5 | 10 |
| Test Run A | | | |
| Initial green strength, Kg/cm$^2$ | 2.64–2.81 | 3.27–3.41 | 3.20–3.48 |
| Peak green strength, Kg/cm$^2$ | 3.30–3.52 | 3.69–3.94 | 3.69–3.87 |
| Green strength at break, Kg/cm$^2$ | 1.41 | 2.28–2.50 | 3.20–3.37 |
| Elongation at break, % | 850–900 | 1050–1140 | 1170–1180 |

As is apparent from the three examples in Table I, equivalent substitution of a halogenated polymer, Neoprene W, for polybutadiene in Stock A, resulted in higher peak green strength, higher green strength at break and higher green stock elongation properties. Incorporation of 10 phr Neoprene W gave directionally higher green strength properties than 5 phr Neoprene W according to the results reported herein. Based upon the foregoing results provided in Table I, it is apparent that the presence of a halogenated polymer is effective in improving the green strength properties of a vulcanizable rubber composition, i.e., a body ply skim.

In conclusion, it is to be understood that all methods and rubber compounds disclosed herein fall within the scope of the claimed invention and that the subject invention is not to be limted by the examples set forth herein. As will be apparent to those skilled in the art, the selection of other Neoprenes and other halogenated polymers and the amounts thereof can be varied within the scope of my total specification. It is believed that the preparation and use of these various halogenated polymers can be determined without departing from the spirit of the invention herein disclosed and described, the scope of the invention being limited solely by the scope of the attached claims.

I claim:

1. A method for improving the green strength properties of uncured vulcanizable rubber compositions comprising the step of:

mixing polychloroprene with said vulcanizable rubber composition prior to curing in an amount ranging between 5 to 25 weight percent of the rubber in said composition;

wherein said rubber composition comprises blends of natural rubber and at least 10 percent by weight of synthetic rubbers, wherein said synthetic rubbers are selected from the group consisting of styrene butadiene rubber, polybutadiene and synthetic isoprene rubber.

2. A method, as set forth in claim 1, wherein said polychloroprene contains about 40 percent chlorine by weight and has a high degree of crystallinity.

3. A method as set forth in claim 2, wherein the amount of polychloroprene is 5 weight percent.

4. A method, as set forth in claim 2, wherein the amount of polychloroprene is 10 weight percent.

5. A method, as set forth in claim 1, wherein said rubber composition comprises a blend of natural rubber, styrene-butadiene rubber and polybutadiene rubber and said halogenated polymer is polychloroprene.

6. A method, as set forth in claim 5, wherein the amount of polychloroprene is 5 weight percent.

7. A method, as set forth in claim 5, wherein the amount of polychloroprene is 10 weight percent.

* * * * *